(12) United States Patent
Zhang

(10) Patent No.: US 8,517,421 B2
(45) Date of Patent: Aug. 27, 2013

(54) VEHICLE SAFETY ANTI-COLLISION DEVICE

(75) Inventor: Xue-qing Zhang, Suzhou (CN)

(73) Assignee: Suzhou Eagle Electric Vehicle Manufacturing Co., Ltd., Suzhou (CN)

(*) Notice: Subject to any disclaimer, the term of this patent is extended or adjusted under 35 U.S.C. 154(b) by 0 days.

(21) Appl. No.: 13/877,895

(22) PCT Filed: Jul. 8, 2011

(86) PCT No.: PCT/CN2011/001125
§ 371 (c)(1),
(2), (4) Date: Apr. 4, 2013

(87) PCT Pub. No.: WO2012/045228
PCT Pub. Date: Apr. 12, 2012

(65) Prior Publication Data
US 2013/0187370 A1 Jul. 25, 2013

(30) Foreign Application Priority Data
Oct. 8, 2010 (CN) .......................... 2010 1 0299396

(51) Int. Cl.
*B60R 21/02* (2006.01)
(52) U.S. Cl.
USPC .......... 280/748; 293/108; 293/120; 293/131; 293/141

(58) Field of Classification Search
USPC ................. 280/748; 293/108, 109, 120, 121, 293/131, 132, 138, 141
See application file for complete search history.

(56) References Cited

U.S. PATENT DOCUMENTS

| | | | | |
|---|---|---|---|---|
| 4,671,550 A * | 6/1987 | Molnar | | 293/120 |
| 6,814,381 B1 * | 11/2004 | Frank | | 293/133 |
| 7,708,323 B2 * | 5/2010 | Suzuki et al. | | 293/132 |
| 8,042,847 B2 * | 10/2011 | Garg et al. | | 293/102 |
| 8,100,444 B2 * | 1/2012 | Erzgraber et al. | | 293/120 |
| 8,132,851 B2 * | 3/2012 | Steller et al. | | 296/187.04 |
| 8,430,437 B2 * | 4/2013 | Asakawa et al. | | 293/133 |
| 8,453,786 B2 * | 6/2013 | Hock et al. | | 180/311 |

* cited by examiner

*Primary Examiner* — Toan To
(74) *Attorney, Agent, or Firm* — Ladas & Parry, LLP

(57) ABSTRACT

Disclosed is a vehicle safety anti-collision device, which includes an outer housing, a buffer material block, a bracket, and a bracket base. Said outer housing is provided with a front end portion, a connecting portion extending from both sides of the front end portion, and a receiving opening formed by said connecting portions and said front end portion. Said bracket is in the shape of an arch bridge and is provided with an arch portion received in said receiving opening and mounting portions on both ends of the arch portion. Said buffer material block is sandwiched between said outer housing and said bracket, and the connecting portions of said outer housing are fixed to the said bracket. With the vehicle safety anti-collision device, the energy generated during a vehicle collision can be absorbed immensely, and the damage caused by collision to the vehicle and people can be reduced.

10 Claims, 9 Drawing Sheets

VEHICLE SAFETY ANTI-COLLISION DEVICE

CROSS REFERENCE TO RELATED APPLICATIONS

This application is the U.S. National Stage of International Patent Application No. PCT/CN2011/001125 filed on Jul. 8, 2011, which claims priority to Chinese Patent Application No. 201010299396.6 filed on Oct. 8, 2010, the disclosures of which are hereby incorporated by reference in their entireties.

BACKGROUND OF THE INVENTION

1. Field of the Invention

The present invention relates to a vehicle applicable safety anti-collision device, more particularly to an anti-collision device applied to motorbike or electric bicycle.

2. Description of Related Art

Because of low safety factor of the motorbike or the two-wheeled electric bicycle, it is an important measure to assemble more securable brush guards to the motorbike or the two-wheeled electric bicycle. While, there is no relevant standard regarding the motorbike or the two-wheeled electric bicycle. Moreover, the manufacturing factories are negative at designing or improving corresponding safety equipment. Ordinary motorbike factories seldom designed the aesthetic and solid brush guard. For some producers, there is even no brush guard designed on their products. As for factories producing two-wheeled electric bicycles, only aesthetic factor of the configuration is considered while the security of the whole product is ignored during the design process.

The current brush guards are designed only for the circumstances of sidewards collision. For example, most of the brush guards of the motorbikes sold in the market are located on opposite sides of the motorbike. Such type of the brush guard is usually soldered to the motorbike according to the need of the individual. Once the motorbike is fell down to the earth, the knees of the driver are easily subject to a wound. As for the two-wheeled electric bicycle, only a kind of curved metal pipe is assembled to the bicycle, which can not protect the driver from a collision.

According to accident statistics, a lot of accidents are happened when the two motorbikes or electric bicycles are droved face to face. A large amount of energy generated from such a face-to-face collision will make the wheels deforming which in turn destroys the steering system and the frame of the vehicle. Obviously, the driver is then subject to a dangerous environment if no device with absorbing energy means is designed on the vehicle. It is easily to see that there is no effective anti-collision device with respect to the motorbike or the two-wheeled electric bicycle, especially, under a front collision situation.

Hence, it is necessary to provide a new kind of safety anti-collision device to address problems mentioned above.

BRIEF SUMMARY OF THE INVENTION

The technical issue resolved by the present invention is to provide a vehicular safety anti-collision device which can reduce collision impact on the vehicle and decreases dangers to the driver.

In order to resolve the above-described technical issue, the present invention adopts the following technical solution: a vehicular safety anti-collision device comprises an outer housing, a buffer material block, a bracket and a bracket base. The outer housing has a front end portion, connecting portions extending from opposite sides of the front end portion and a receiving opening defined by the front end portion and the connecting portions. The bracket is formed in a shape of arch bridge and provided with an arched portion and mounting portions on opposite sides of the arched portion. The buffer material block is sandwiched between the outer housing and the bracket, the connecting portion of the outer housing fixed to the bracket.

Further, the connecting portion of the outer housing from defines a slanted face extending inwards and a fixing hole thereon for fixing with the bracket.

Further, the buffer material block is formed in a tongue shape and has an arc front end and arm portions extending from opposite sides of the arc front end, and wherein the arm portion forms a cooperating face projecting inwards and cooperating with the slanted face of the outer housing.

Further, the buffer material block defines an arched inner face and a stepped portion located below the inner face.

Further, the bracket is formed in a shape of arch bridge and is provided with an arched portion and mounting portions on opposite sides of the arched portion, and wherein the mounting portion includes a mounting face, fixing through holes on the mounting face, an engaging end face and a recess adapted for fixing the arm portions of the buffer material block Further, the bracket base is formed in a triangular prism shape, which is provided with an arched concave surface and a pair of connecting surfaces, and wherein the bracket base is fixedly assembled with the engaging end face.

Further, a reinforcing rib is formed between the pair of connecting surfaces and the pair of connecting surfaces is fixed assembled with the engaging end face of the mounting portion of the bracket.

Further, the vehicular safety anti-collision device further comprises a fastening subassembly adapted for fixedly assembling the outer housing and the bracket, and wherein the fastening subassembly comprises a positioning element and a securing clamp griping the positioning element.

Further, the positioning element comprises a plastic material positioning sleeve, a ring washer located at one end of the positioning sleeve and a metal sleeve located at the other end of the positioning sleeve, and wherein the positioning sleeve, the washer and the metal sleeve define through holes thereof respectively to thereby communicate with each other.

Further, the securing clamp is formed in a shape of "Π", which comprises oppositely positioned two gripping arms and a connecting arm connecting the two gripping arms, wherein a hexagon nut is provided on one gripping arm and protruding away from the other one gripping arm, and wherein the oppositely positioned two gripping arms each define a round hole thereof which share a same central axis.

The foregoing has outlined rather broadly the features and technical advantages of the present invention in order that the detailed description of the invention that follows may be better understood. Additional features and advantages of the invention will be described hereinafter, which form the subject of the claims of the invention.

Compared with the conventional technology, the vehicular safety anti-collision device of the present invention has beneficial effects in that: it can absorb large amount of energy generated from vehicle collision and decrease damages to corresponding driver or passenger.

DETAILED DESCRIPTION OF THE PREFERRED EMBODIMENTS

Referring to FIGS. 1-9, the present invention provides a vehicular safety anti-collision device, which comprises an outer housing 10, a buffer material block, a bracket 30 and a bracket base 40. The vehicular safety anti-collision device is assembled on a front end of the vehicle, which can exactly absorb the energy generated from a vehicular collision.

Figure 1:
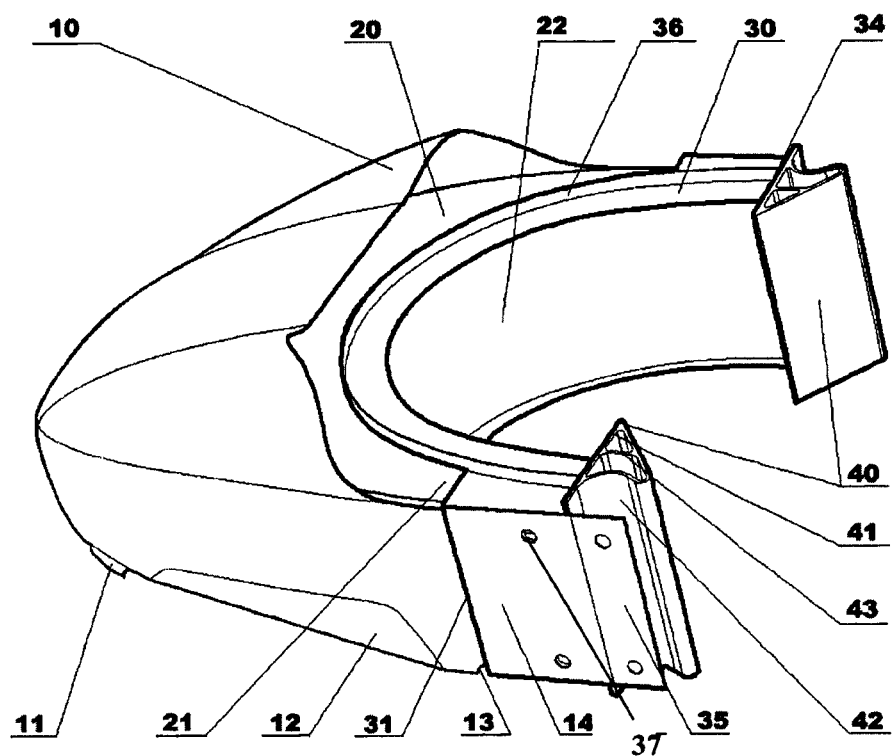
FIG. 1 is an assembled, perspective view of a vehicular safety anti-collision device in accordance with the present invention.
Figure 2:
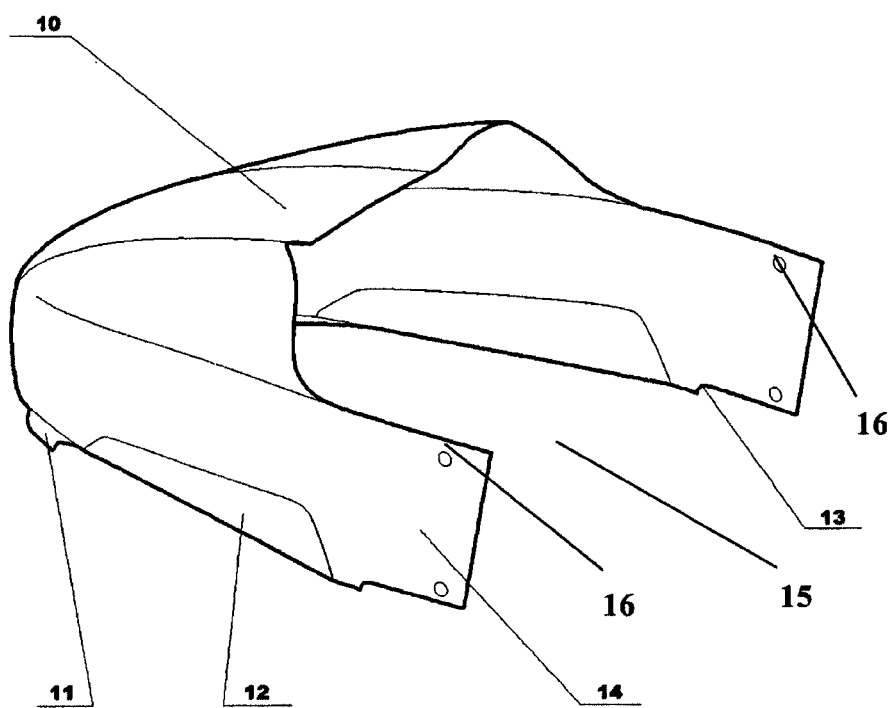
FIG. 2 is a perspective view of an outer housing of the vehicular safety anti-collision device of the present invention.

Referring to FIG. 2, the outer housing 10 has a bag-like shape, which forms an arced, front end portion 11 and connecting portions 14 extending backwards from opposite sides of the front end portion 11. The front end portion 11 and the connecting portions 14 define therebetween a receiving opening 15 adapted for receiving the buffer material block 20. The connecting portion 14 provides a slanted face 12 extending inwards on an outer face thereof and a fixing hole 16 for fixing purpose. The connecting portion 14 has a cutout 13 formed at a bottom edge thereof.

Figure 3:
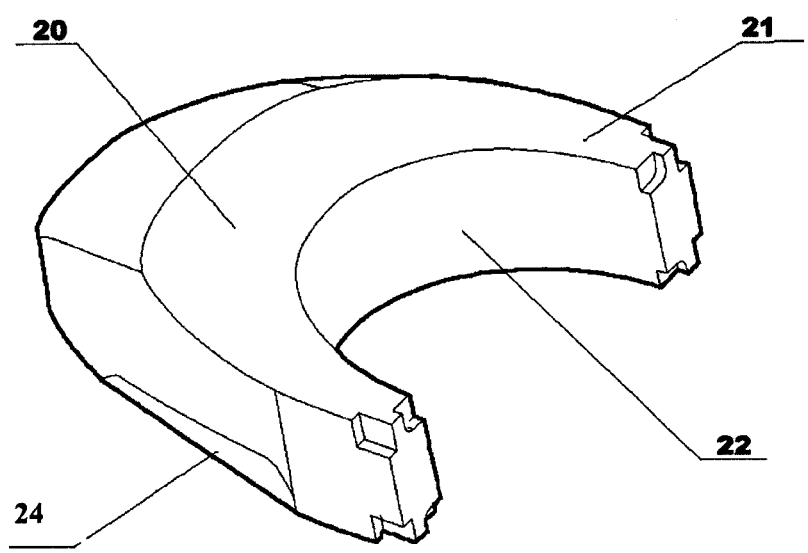
FIG. 3 is a perspective view of a buffer material block of the vehicular safety anti-collision device of the present invention.

Referring to FIG. 3, the buffer material block 20 is formed in a tongue shape, which has an arc front end and arm portions 21 extending from opposite sides of the arc front end. The buffer material block 20 is received in the receiving opening 15 of the outer housing 10 to thereby engage with the outer housing 10. The buffer material block defines an arched inner face 22 and a stepped portion 23 located below the inner face 22. The inner face 22 is employed to engage with the bracket 30. The stepped portion 23 has a configuration corresponding to the inner face 22 for positioning purpose. The arm portion 21 forms a cooperating face 24 projecting inwards on an outer face thereof and a mating portion located at one side of the cooperating face 24. The cooperating face 24 cooperates with the slanted face 12 of the outer housing 10. The mating portion is used to cooperate with the bracket 30.

Figure 4:
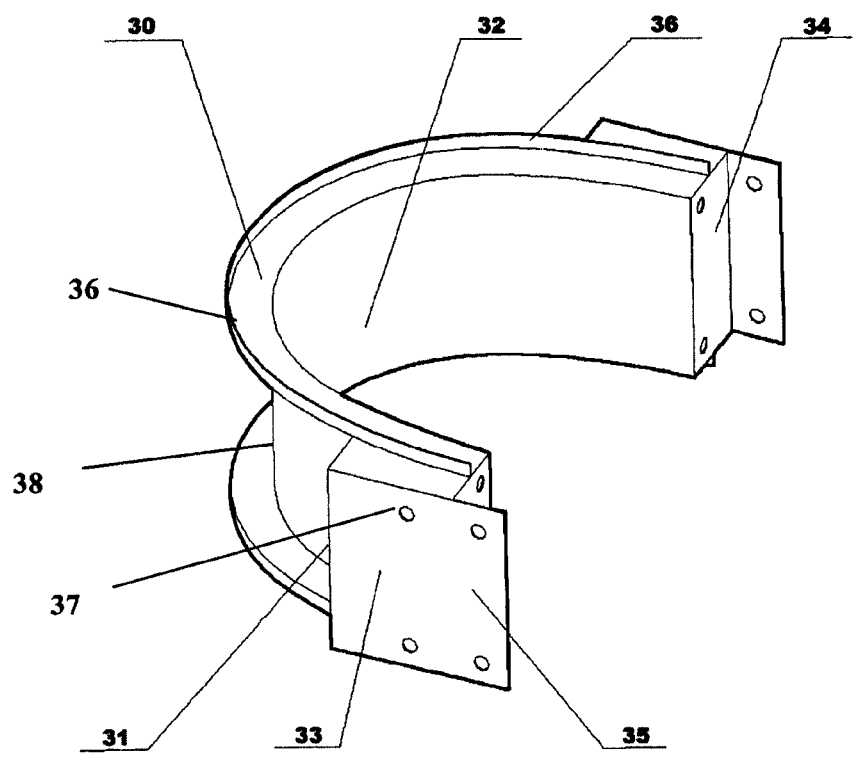
FIG. 4 is a perspective view of a bracket of the vehicular safety anti-collision device of the present invention.

Referring to FIG. 4, the bracket 30 is formed in a shape of an arch bridge, which engages with the outer housing 10 to thereby sandwich the buffer material block 20 therebetween. The bracket 30 is provided with an arched portion 36 and a mounting portion 33 on opposite sides of the arched portion 36. The arched portion 36 defines an inner arched face 32 and an outer arched groove 38. The inner arched face 32 is used to engage and fix with the front end of the vehicle. The outer arched groove 38 is used to fix the buffer material block 20. The mounting portion 33 includes a mounting face 35, fixing through holes 37 on the mounting face 35, an engaging end face 34 and a recess 31 adapted for fixing the arm portions 21 of the buffer material block 20. The engaging end face 34 is used to engage and assemble with the bracket base 40. The recess 31 can receive a distal end of the arm portions 21 to thereby position the buffer material block 20.

Figure 5:
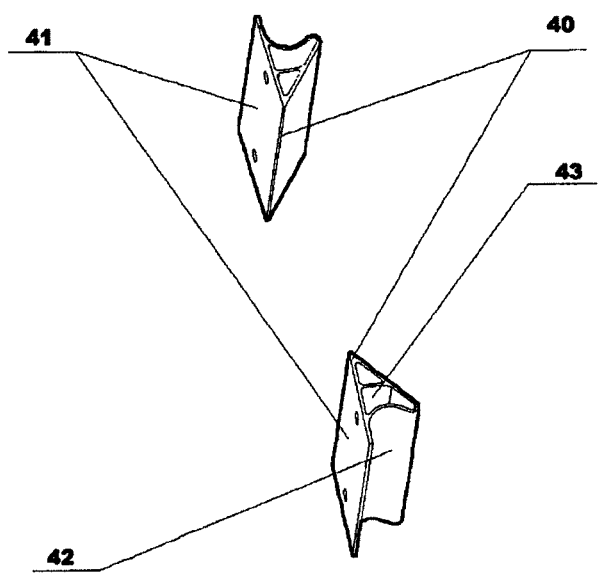
FIG. 5 is a perspective view of a bracket base of the vehicular safety anti-collision device of the present invention.

Referring to FIG. 5, the bracket base 40 is assembled at opposite sides of the mounting portion 33, which is formed in a triangular prism shape. The bracket base 40 is provided with an arched concave surface 42 and a pair of connecting surfaces 41. The arched concave surface 42 is used for better engagement with a configuration of the front end of the vehicle. The connecting surface 41 and the engaging end face 34 engage and fix with each other. A reinforce rib 43 is formed between the pair of connecting surfaces 41 to thereby better secure the bracket base 40 which can be subject to more load.

During assembly, the bracket 30 and the buffer material block 20 engage to each other with the arched portion 36 of the bracket 30 cooperating with the arced inner face 22 of the buffer material block 20. The mounting portion 33 of the bracket 30 is in contact with the arm portion 21 of the buffer material block 20. Finally, the outer housing 10 is assembled to the buffer material block 20 with the connecting portion 14 inserting into an inside of the mounting portion 33 of the bracket 30. Further, the outer housing 10 and the bracket 30 are securely connected by engagement between a fastening subassembly 80, the fixing hole 16 and the fixing through hole 37. The buffer material block 20 is sandwiched between the outer housing 10 and the bracket 30, which has a better buffering performance. When a front vehicle collision is happened, the buffer material block 20 can absorb more energy and reduce the impact force on the bracket 30 so as to avoid deformation of the bracket 30 and protect the steering system and the frame of the vehicle. Besides, the buffer material block 20 has a light weight and a low manufacturing cost. The outer housing 20 can protect the inside buffer material block 20 and satisfy the requirement of the overall shape of the vehicle. Moreover, the shape of the outer housing 10 can be designed according to the overall shape of the vehicle.

Figure 6:
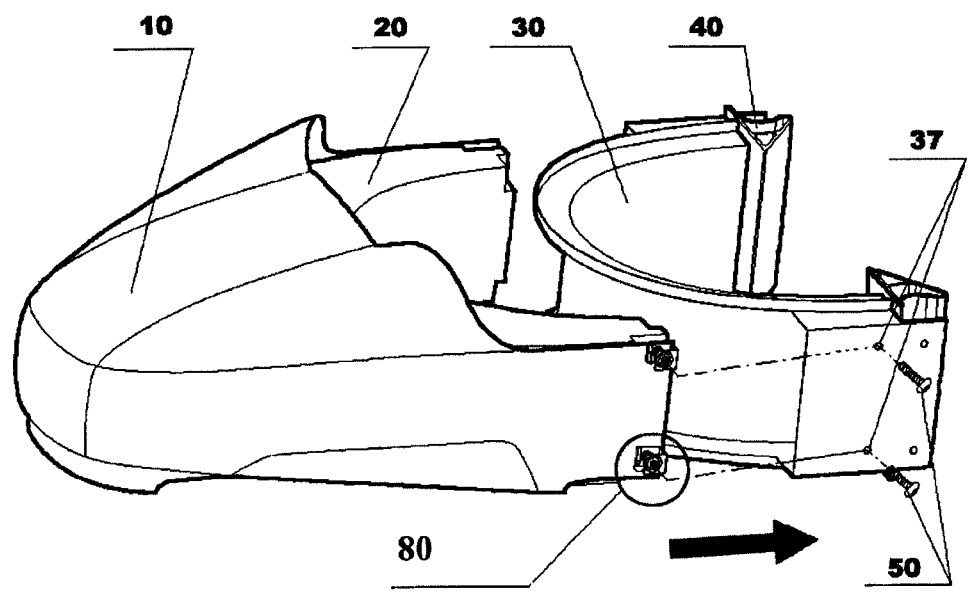
FIG. 6 is a partial, perspective view of the vehicular safety anti-collision device of the present invention.

It is worth mentioning that, in order to securely connect the outer housing 10 and the bracket 30 and avoid undesired broken between the outer housing 10 and the bracket 30 due to poor road conditions, the present invention also provides the fastening subassembly 80 as shown in FIG. 6, based on safety purpose. The fastening subassembly 80 is secured at the fixing hole 16 and the fixing through hole 37, which includes a positioning element 70, a metal securing clamp 60 gripping the positioning element 70 and a screw bolt 50 inserted through the positioning element 70 and the securing clamp 60.

Figure 8:
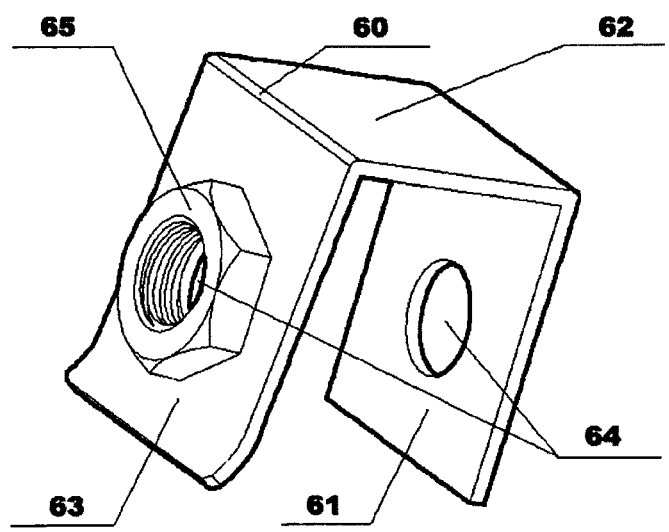
FIG. 8 is a perspective view of a securing clamp of a fastening subassembly of the vehicular safety anti-collision device of the present invention.

Referring to FIG. 8, the metal securing clamp 60 is formed in a shape of "Π", which comprises oppositely positioned two gripping arms 61, 63 and a connecting arm 62 connecting the two gripping arms 61, 63. The two gripping arms 61, 63 define therebetween an angle, which are not positioned in a parallel manner. The two gripping arms 61, 63 and the connecting arm 62 together defines a receiving space for receiving the positioning element 70. The gripping arm 61 is perpendicularly positioned to the connecting arm 62 and defines thereon a round hole 64 for insertion of the screw bolt 50. A hexagon nut 65 is provided on the gripping arm 63 and protruding away from the other one gripping arm 61. The hexagon nut 65 defines a round hole 64 in a center thereof, which shares a same central axis with the round hole 64 of the gripping arm 61 to thereby smoothly insert the screw bolt 50 through the securing clamp 60.

Figure 9:
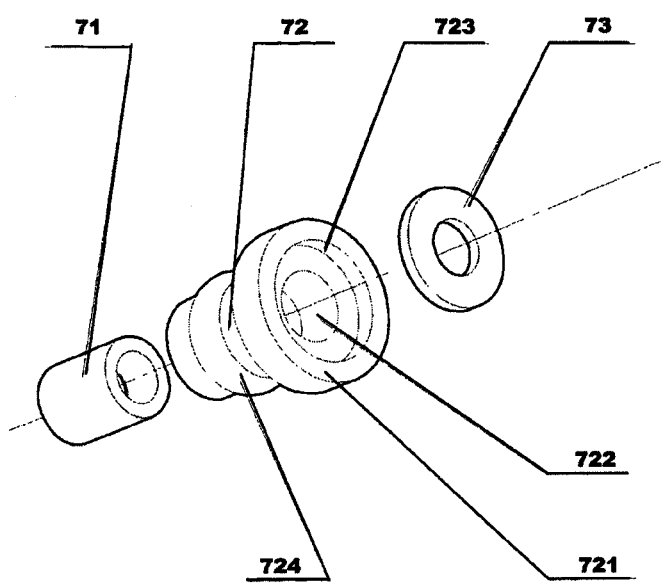
FIG. 9 is an exploded, perspective view of a positioning element of the vehicular safety anti-collision device of the present invention.

Referring to FIG. 9, the positioning element 70 comprises a plastic material positioning sleeve 72, a ring washer 73 located at one end of the positioning sleeve 72, a metal sleeve 71 and through holes 722 through respectively the positioning sleeve 72, the metal sleeve 71 and the ring washer 73. The positioning sleeve 72 forms a round stepped portion 723, which is recessed from an end face 721 and adapted for receiving the ring washer 73, and an annular protrusion 724. The positioning sleeve 72 is secured within the fixing hole 16 so that opposite ends of the positioning sleeve 72 are correspondingly located at opposite sides of the fixing hole 16 with the annular protrusion 724 locating adjacent to the gripping arm 63. The outer housing 10 is protected from undesired displacement from the original position so as to achieve a better positioning relationship between the positioning element 70 and the outer housing 10.

Figure 7:
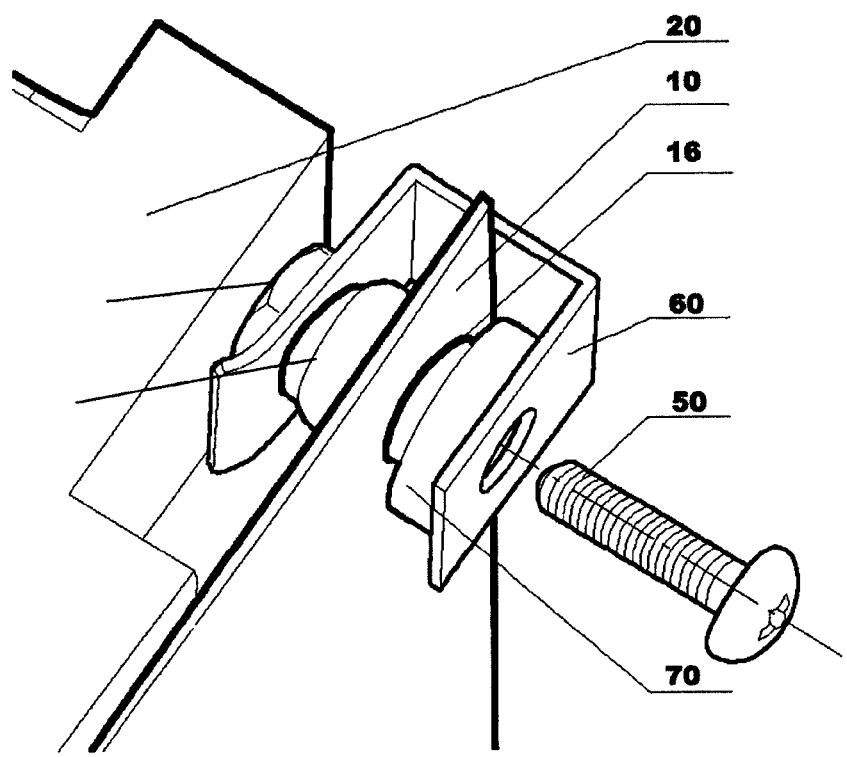
FIG. 7 is a partially enlarged, perspective view of the vehicular safety anti-collision device of the present invention.

Referring to FIG. 7, the through hole 722 of the positioning element 70 and the round hole 64 of the securing clamp 60 are defined correspondingly. In assembly, the positioning element 70 is positioned with respect to the outer housing 10 by inserting through the fixing hole 16 of the outer housing 10. The annular protrusion 724 is located in the fixing hole 16 adjacent to the buffer material block 20. Then, the metal securing clamp 60 grips the positioning element 70 with the positioning element 70 being gripped between the two gripping arms 61, 63. The hexagon nut 65 of the securing clamp 60 is positioned adjacent to the buffer material block 20. Finally, the screw bolt 50 is inserted respectively through the fixing through hole 37, the round hole 64, the through hole 722 and the fixing hole 16. The secured positioning of the outer housing 10 and the bracket 30 is achieved. The secured positioning of the buffer material block 20 is also achieved. The fastening subassembly 80 firmly connects the outer housing 10, the bracket 30 and the buffer material block 20 which is sandwiched between the outer housing 10 and the bracket 30. The safety of vehicle is guaranteed by such a firm connection which in turn protects the vehicle under the undesired road condition.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

I claim:

1. A vehicular safety anti-collision device comprising an outer housing, a buffer material block, a bracket and a bracket base, characterized in that, the outer housing having a front end portion, connecting portions extending from opposite sides of the front end portion and a receiving opening defined by the front end portion and the connecting portions, the bracket formed in a shape of arch bridge and provided with an arched portion and mounting portions on opposite sides of the arched portion, the buffer material block sandwiched between the outer housing and the bracket, the connecting portion of the outer housing fixed to the bracket.

2. The vehicular safety anti-collision device as claimed in claim 1, wherein the connecting portion of the outer housing from defines a slanted face extending inwards and a fixing hole thereon for fixing with the bracket.

3. The vehicular safety anti-collision device as claimed in claim 2, wherein the buffer material block is formed in a tongue shape and has an arc front end and arm portions extending from opposite sides of the arc front end, and wherein the arm portion forms a cooperating face projecting inwards and cooperating with the slanted face of the outer housing.

4. The vehicular safety anti-collision device as claimed in claim 3, wherein the buffer material block defines an arched inner face and a stepped portion located below the inner face.

5. The vehicular safety anti-collision device as claimed in claim 4, wherein the bracket is formed in a shape of arch bridge and is provided with an arched portion and mounting portions on opposite sides of the arched portion, and wherein the mounting portion includes a mounting face, fixing through holes on the mounting face, an engaging end face and a recess adapted for fixing the arm portions of the buffer material block.

6. The vehicular safety anti-collision device as claimed in claim 5, wherein the bracket base is formed in a triangular prism shape, which is provided with an arched concave surface and a pair of connecting surfaces, and wherein the bracket base is fixedly assembled with the engaging end face.

7. The vehicular safety anti-collision device as claimed in claim 6, wherein a reinforcing rib is formed between the pair of connecting surfaces and the pair of connecting surfaces is fixed assembled with the engaging end face of the mounting portion of the bracket.

8. The vehicular safety anti-collision device as claimed in claim 1, wherein the vehicular anti-collision safety device further comprises a fastening subassembly adapted for fixedly assembling the outer housing and the bracket, and wherein the fastening subassembly comprises a positioning element and a securing clamp griping the positioning element.

9. The vehicular safety anti-collision device as claimed in claim 8, wherein the positioning element comprises a plastic material positioning sleeve, a ring washer located at one end of the positioning sleeve and a metal sleeve located at the other end of the positioning sleeve, and wherein the positioning sleeve, the washer and the metal sleeve define through holes thereof respectively to thereby communicate with each other.

10. The vehicular safety anti-collision device as claimed in claim 8, wherein the securing clamp is formed in a shape of "Π", which comprises oppositely positioned two gripping arms and a connecting arm connecting the two gripping arms, wherein a hexagon nut is provided on one gripping arm and protruding away from the other one gripping arm, and wherein the oppositely positioned two gripping arms each define a round hole thereof which share a same central axis.

* * * * *